(12) United States Patent  (10) Patent No.: US 11,811,104 B2
Guimard et al.  (45) Date of Patent: Nov. 7, 2023

(54) BIPOLAR PLATE WITH UNDULATING CHANNELS

(71) Applicant: SymbioFCell, Fontaine (FR)

(72) Inventors: Fabien Guimard, La Motte-Servolex (FR); Luc Rouveyre, Cognin (FR)

(73) Assignee: SYMBIOFCELL, Fontaine (FR)

( * ) Notice: Subject to any disclaimer, the term of this patent is extended or adjusted under 35 U.S.C. 154(b) by 79 days.

(21) Appl. No.: 17/041,590

(22) PCT Filed: Mar. 26, 2019

(86) PCT No.: PCT/FR2019/050683
§ 371 (c)(1),
(2) Date: Oct. 12, 2020

(87) PCT Pub. No.: WO2019/186051
PCT Pub. Date: Oct. 3, 2019

(65) Prior Publication Data
US 2021/0020959 A1   Jan. 21, 2021

(30) Foreign Application Priority Data
Mar. 27, 2018  (FR) ...................... 1852655

(51) Int. Cl.
H01M 8/0263 (2016.01)
H01M 8/0265 (2016.01)
H01M 8/0267 (2016.01)
H01M 8/04029 (2016.01)
H01M 8/04119 (2016.01)
H01M 8/04701 (2016.01)
(Continued)

(52) U.S. Cl.
CPC ....... *H01M 8/0263* (2013.01); *H01M 8/0265* (2013.01); *H01M 8/0267* (2013.01); *H01M 8/04029* (2013.01); *H01M 8/04156* (2013.01); *H01M 8/04701* (2013.01); *H01M 8/1004* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

2006/0046130 A1* 3/2006 Lai .................. H01M 8/0228
429/457
2013/0177827 A1  7/2013 Okabe et al.
(Continued)

FOREIGN PATENT DOCUMENTS

| JP | 2008-282777 A | 11/2008 |
| JP | 2010-251068 A | 11/2010 |
| JP | 2014-026822 A | 2/2014 |

OTHER PUBLICATIONS

Search Report issued in French Patent Application No. 1852655 dated Nov. 27, 2018.
(Continued)

*Primary Examiner* — Haroon S. Sheikh
(74) *Attorney, Agent, or Firm* — Pearne & Gordon LLP

(57) ABSTRACT

A bipolar conductive plate for a fuel cell structure, the plate having a network of fluid circulation channels in the form of a succession of undulations with narrowed portions preferably distributed regularly in order to reduce the stratification phenomena.

9 Claims, 6 Drawing Sheets

(51) Int. Cl.
   *H01M 8/1004* (2016.01)
   *H01M 8/10* (2016.01)

(56) References Cited

U.S. PATENT DOCUMENTS

| | | |
|---|---|---|
| 2016/0211533 A1 | 7/2016 | Ishida et al. |
| 2016/0233522 A1 | 8/2016 | Konno |
| 2017/0054162 A1 | 2/2017 | Rouveyre |
| 2017/0170489 A1 | 6/2017 | Kraft et al. |
| 2017/0279131 A1* | 9/2017 | Poirot-Crouvezier ....................... H01M 8/0254 |

OTHER PUBLICATIONS

International Search Report for issued in Application No. PCT/FR2019/050683 dated Aug. 2, 2019.
Written Opinion for PCT/FR2019/050683 dated Aug. 2, 2019.

* cited by examiner

BIPOLAR PLATE WITH UNDULATING CHANNELS

TECHNICAL FIELD AND PRIOR ART

The present application relates to the field of fuel cells and in particular that of hydrogen cells notably of PEMFC (acronym of "Polymer Electrolyte Membrane Fuel Cells" or "Proton Exchange Membrane Fuel Cells") type.

It particularly relates to a fuel cell device having one or more bipolar plates of enhanced design.

A fuel cell 1 is a converter of chemical energy into electrical energy equipped with at least one electrochemical cell 2 comprising an anode 4 separated from a cathode 6 by an electrolyte 8.

The electrochemical cell of a hydrogen cell is generally supplied with two different gases, the first hydrogen oxidising in contact with the anode, the second oxygen or air reduces in contact with the cathode according to the following electrochemical reactions:

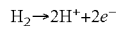  Equation 1

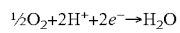  Equation 2

Oxidation produces electrons circulating from the anode 4 to the cathode 6 via an electric circuit 10 external to the cell, such that an element 12 integrated into this electric circuit 10 can be supplied with electricity by the cell.

The membrane 8 separating the electrodes 4, 6 is generally made from porous and electrically insulating, but ion-conducting material. Cells of PEMFC type fuel cells typically have an electrolyte in the form of a proton exchange membrane based on polymer, particularly fluoropolymer.

A PEMFC type fuel cell is typically produced by stacking elementary cells, each cell being formed between a face of a bipolar plate, of an element known as MEA ("membrane electrode assembly" corresponding herein to the anode membrane cathode stack) and a face of another bipolar plate.

Bipolar plates have several functions:
Supplying reagents (hydrogen at anode end and air or oxygen at cathode end) via channels on the reagent sites;
Collecting and conducting electric current from the anode of one cell to the cathode of the adjacent cell;
The mechanical strength of the elementary cells, the latter needing to withstand particularly mechanical stress due to clamping of the stack;
Gas-tightness;
Discharging heat;
Discharging unused gases and water produced during the reaction.

For this, bipolar plates are generally provided with grooves or channels on each face, the channels of a first face enabling hydrogen supply, whereas the channels of a second face opposite the first face enable oxygen supply.

The reactants are thus introduced to the electrodes 4, 6 via supply channels present in the bipolar plates 13, these supply channels also making it possible to discharge the product of the electrochemical reactions. The volume delimited by a supply channel and an electrode forms an anodic compartment 14 when the electrode is the anode, or a cathodic compartment 16, when the electrode is the cathode (FIG. 1).

The performances of an electrochemical hydrogen cell are particularly dependent on the moisture content of the membrane 8: this moisture enables satisfactory ion conduction of the hydrogen ions via the membrane 8. The hydration of the membrane 8 is maintained naturally thanks to the water generated at the level of the cathode.

A fraction of the water generated at the cathode is transferred to the anode after diffusion through the membrane 8.

A water accumulation phenomenon in the compartments intended for hydrogen can then occur. However, a moisture content or an excessive accumulation of water at the anode is liable to:
cause a reduction of the active surface area of the anode and therefore an increase in the current density traversing the still active zones thereof,
cause overvoltages at the anode which reduces the voltage delivered by the cell and hence the efficiency thereof,
decrease the current suitable for being generated by the cell for a voltage at the terminals set by the external circuit, and hence the power thereof,
create a hydrogen shortage in localised embedded zones which may cause a degradation of the cell structure and reduce the service life thereof,
increase nitrogen diffusion from the cathode to the anode excessively causing a hydrogen shortage liable to degrade the cell.

In other words, excessive stagnation of water, liquid, and gas accumulation, particularly in the anodic compartment, degrades the performances of an electrochemical cell.

The problem arises of finding an enhanced novel device in relation to the drawbacks mentioned above.

DESCRIPTION OF THE INVENTION

An embodiment of the present invention envisages a bipolar conductive plate suitable for being inserted into a fuel cell structure, said plate including on a first outer face, a first array of one or more fluid circulation channels arranged in parallel and each having a path in the form of a succession of undulations.

This particular shape of the channels makes it possible, using centrifugal force, to prevent stagnation and water plugs and thus encourage gas flow in the channels. It helps obtain a superior efficiency.

The channels further advantageously include portions of contracted cross-section. Such a shape of the channels makes it possible to locally create accelerations of gases carried by the channels. Combined with the undulating shape, the contracted portions contribute to superior gas circulation in the channels.

Advantageously, the portions of contracted cross-section are distributed regularly, in other words periodically according to a predetermined period in the path of said channels. Preferably, the portions of contracted cross-section are distributed at peaks or hollowed zones of said undulations.

The bipolar conductive plate can also include on a second outer face opposite said first outer face, a second array of fluid circulation channels also in the form of a succession of undulations.

The channels of the second array also preferably include portions of contracted cross-section.

A particular embodiment envisages that the undulations of the channels of the second array can be arranged in phase shift or advantageously in phase opposition with respect to the undulations of the channels of said first array of channels.

The second array typically includes a greater number of channels than the first array.

According to an option of use of the bipolar conductive plate wherein said first outer face is a face of a first sheet assembled with a second sheet a face whereof forms said second outer face, the channels of the first array being grooves formed in the first sheet, the channels of the second array being grooves formed in the second sheet, the grooves of the first array and the grooves of the second array bearing against one another at several points, the grooves of the first array being arranged with respect to the grooves of the second array so as to arrange a volume for the passage of heat transfer fluid.

The present invention also relates to a fuel cell structure equipped with one or more bipolar conductive plate(s) as defined above.

An embodiment of the present invention particularly envisages a fuel cell structure comprising:
at least one membrane electrode assembly,
a first bipolar plate, located on a first side of the membrane electrode assembly and provided with an array of anodic channels in the form of a succession of undulations,
a second bipolar plate located on a second side of the membrane electrode assembly and provided with an array of cathodic channels in the form of a succession of undulations, the undulations of the array of cathodic channels being in phase opposition with respect to the undulations of the anodic channels or having a path having inverted radii of curvature with respect to a path of the anodic channels.

Such a configuration also enables superior water distribution on either side of the membrane and thus helps improve the efficiency of a cell equipped with such plates.

The present invention also relates to a vehicle equipped with a fuel cell comprising at least one bipolar conductive plate as defined above.

BRIEF DESCRIPTION OF THE DRAWINGS

Further details and features of the invention will emerge from the following description, with reference to the following appended figures.

Identical, similar, or equivalent parts of the different figures bear the same references so as to facilitate the transition from one figure to another. The different parts represented in the figures are not necessarily on a uniform scale, in order to render the figures more readable.

Identical, similar, or equivalent parts of the different figures bear the same reference numbers so as to facilitate the transition from one figure to another.

The different parts represented in the figures are not necessarily on a uniform scale, in order to render the figures more readable.

DETAILED DESCRIPTION OF SPECIFIC EMBODIMENTS

Figure 1:
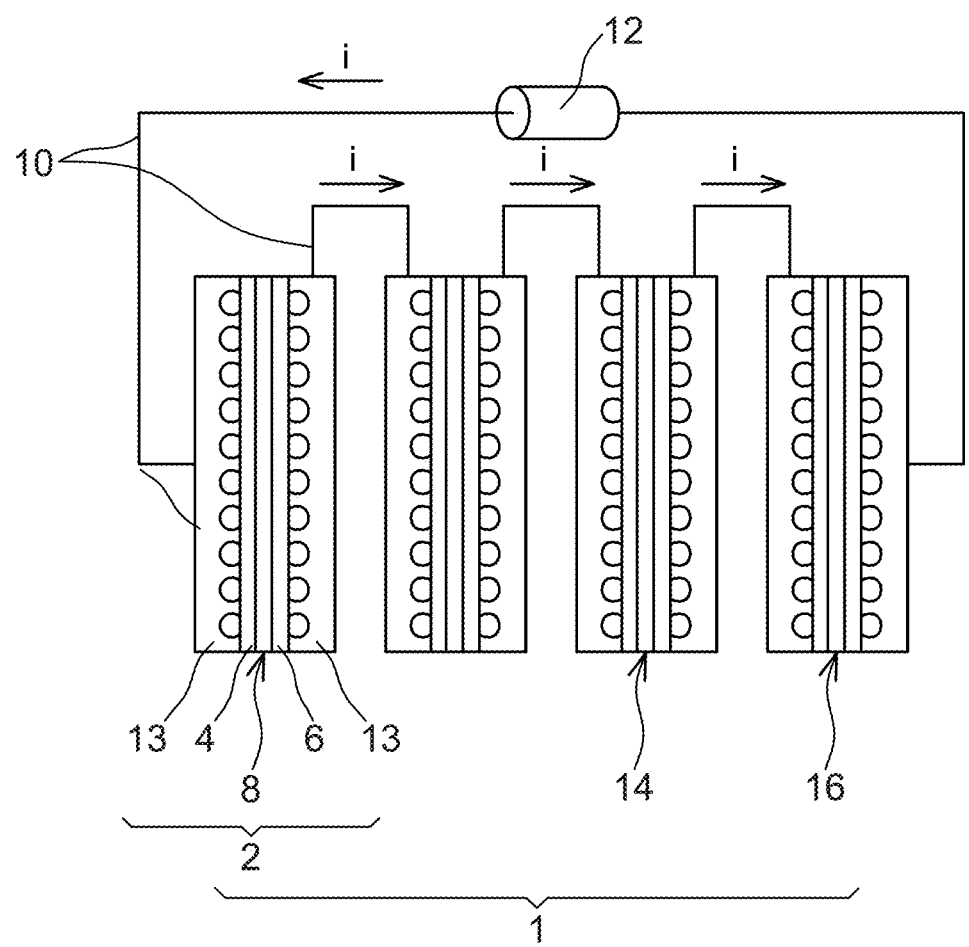
FIG. 1 illustrates schematically a fuel cell and the bipolar plates thereof.
Figure 2A:
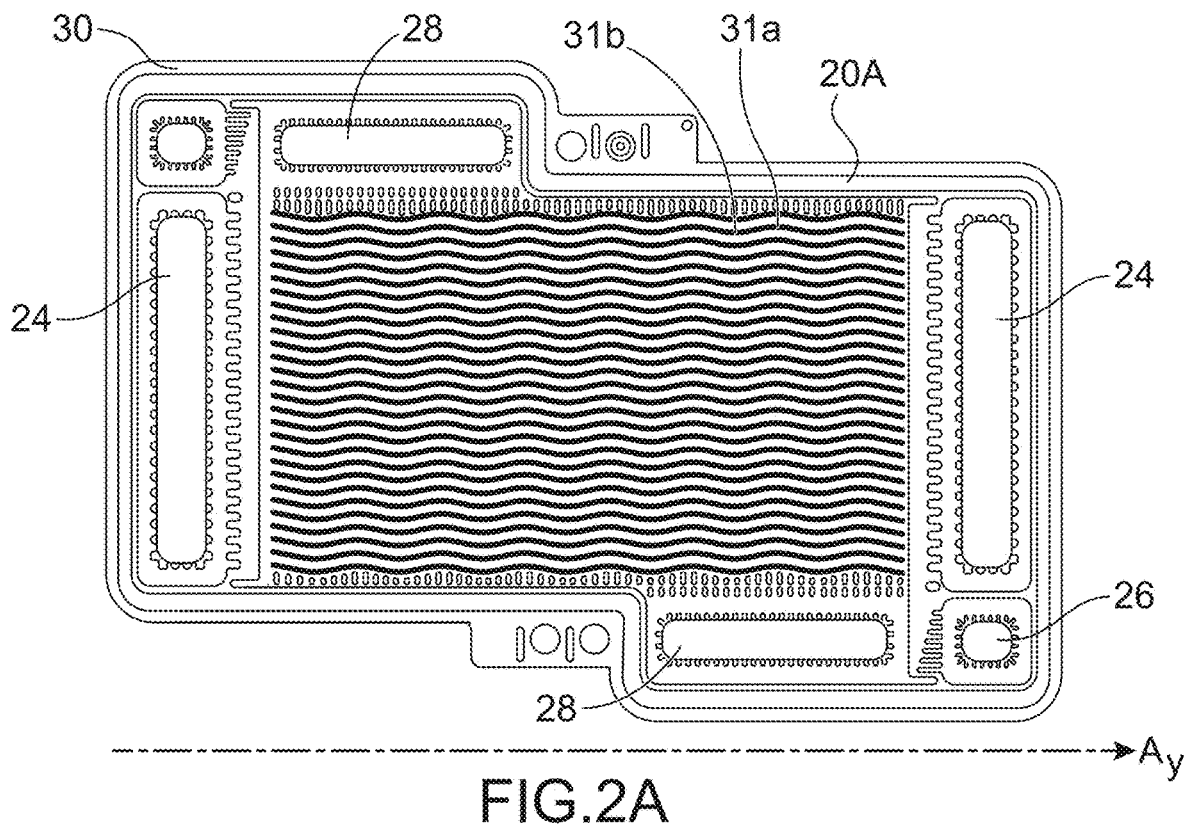
FIGS. 2A-2B illustrate a bipolar conductive plate equipped with arrays of anodic and cathodic channels of slightly undulating shape.
Figure 2B:
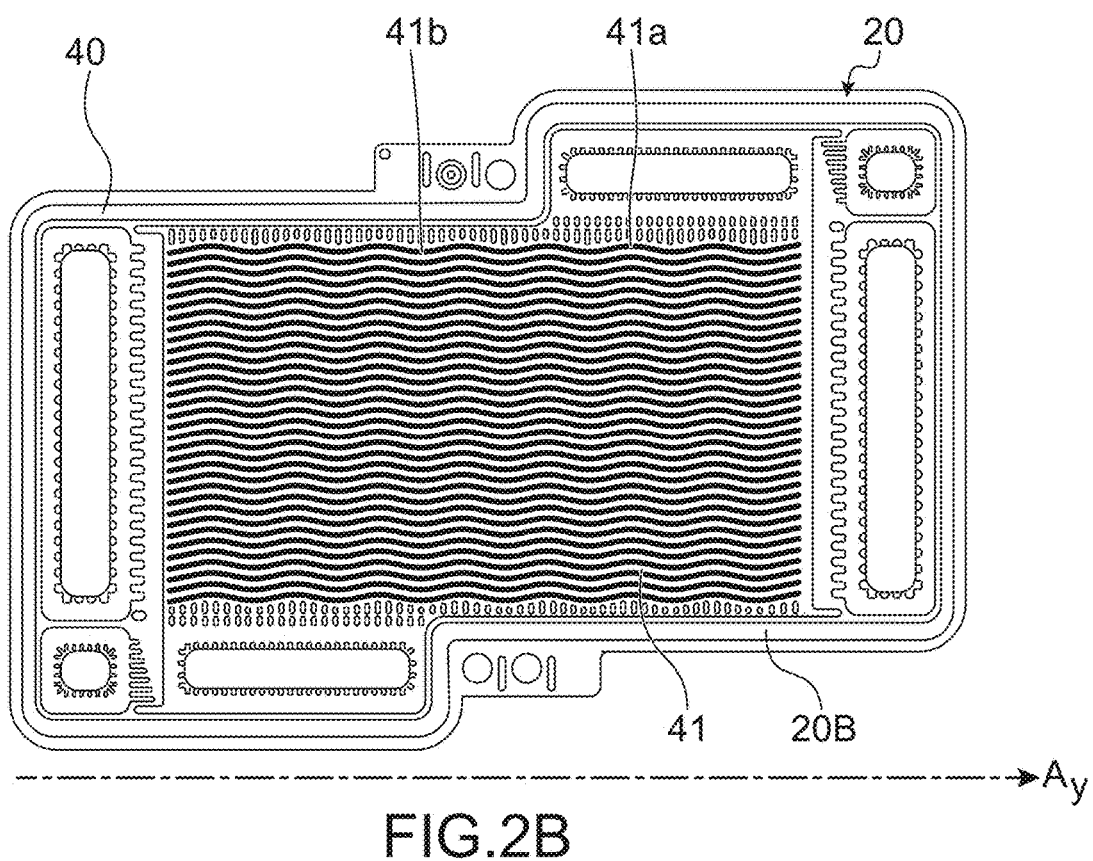

FIGS. 2A, 2B respectively show a first outer face 20A and a second outer face 20B, opposite the first face 20A of a bipolar conductive plate 20 as used according to an embodiment of the present invention. This plate 20, based on a material conducting electricity and preferably suitable for resisting corrosion can be a metallic material such as a stainless steel, for example 316L type of the AISI standard corresponding to reference Z2CND17-12 of the Afnor NF A 35573 standard. The plate 20 includes on the first outer face 20A grooves forming fluidic channels 31 and on the second outer face 20B grooves forming fluidic channels 41.

The bipolar conductive plate 20 is suitable for being integrated in a fuel cell formed of a stack of electrochemical cells typically including a plurality of stacked bipolar plates of the same type. In a stack for example of 230 cells, it is possible to provide 229 bipolar conductive plates as described below, and 2 end conductive plates on either end of the stack. In a stack for example of 70 cells, it is possible to provide for example 69 bipolar conductive plates as described below, and 2 end conductive plates on either end of the stack.

The bipolar conductive plate 20 can be made of one piece or, as in the example illustrated in FIGS. 2A, 2B, be the result of an assembly of several parts such as sheets 30, 40 disposed against one another and assembled.

The first face 20A of the plate 20 (FIG. 2A) includes in particular a first array of fluid circulation channels 31 arranged in parallel. The channels 31 are herein anodic channels wherein hydrogen is intended to circulate. The grooves as well as other hollowed patterns formed in the plate 20, herein in the sheet 30, can be produced using various techniques such as moulding or embossing or stamping or even by machining. For example, a water jet machining technique can be used to define the grooves.

On the first outer face 20A of the plate 20, the juxtaposed channels 31 each extend along an axis which is parallel with a longitudinal axis Y of the plate 20, in other words, along an axis parallel with the greater side of the plate 20. The fluidic channels 31 each have a path in the form of a succession of undulations, in other words, forming a sequence of curved regions which can be advantageously distributed periodically on either side of a given axis parallel with the longitudinal axis Y, by creating a succession of peaks 31a and troughs 31b. The channels 31 of the first fluidic array are preferably disposed in phase with one another, such that the undulation peaks 31a and troughs 31b of a channel 4 are aligned in the same plane orthogonal to the plate 20 with respectively the undulation peaks 31a and troughs 31b of the other channels.

The undulating shape of the channels 31 makes it possible to encourage discharge of the water produced in an electrochemical cell and prevent a stratification phenomenon liable to create a blockage of reactants in the channels or water saturation at the level of the diffusion layers of a membrane-electrode assembly structure suitable for being adjoined to the bipolar plate. The shape of the channel 31 via an undulating path guiding the flow of the reactants makes it possible, using centrifugal force, to prevent stagnation and liquid plugs and thus encourage gas flow.

Changes in direction of curved regions make it possible to discharge water droplets more effectively which could stagnate and break the stratification thereof.

An interval of patterns forming the undulations and an amplitude of these patterns (in other words an amplitude of the troughs 31b and peaks 31a) that are sufficiently low and a sufficiently high radius of curvature are provided so that the channels 31 essentially include slight undulations, in other words, having a similar shape to those of straight channels.

A range of radius of curvature of the undulations making it possible to maximise contact between the first face 20A of the bipolar plate 20 and an MEA assembly while maximising the electrical performances of a cell equipped with this MEA assembly, is for example chosen between 20 mm and 50 mm.

Figure 3:
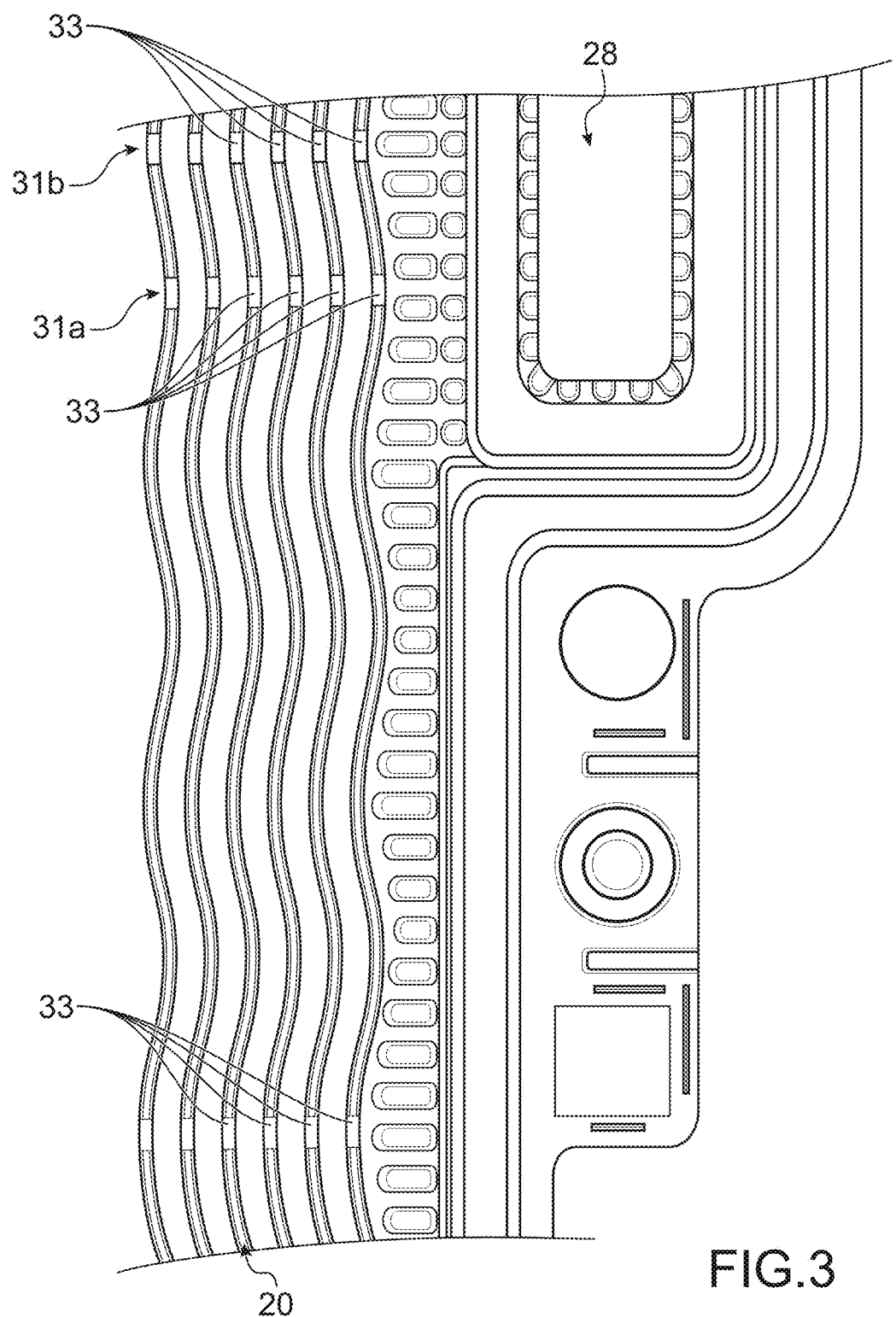
FIG. 3 illustrates a specific configuration of anodic or cathodic channels in forms of succession of undulations and with portions of contracted cross-sections.

As can be seen in the enlarged partial view of FIG. 3, the channels 31 can also include localised portions 33 of contracted cross-sections. The contraction is dependent on the level of head loss sought in order to enable discharge of the water droplets. A head loss of the order of several tens of mbar, for example of the order of 20 mbar of head losses can be envisaged.

The channels 31 are thus provided with a given cross-section and include localised portions 33 of smaller cross-section than the given cross-section. The contraction can be envisaged so as to obtain a cross-section at least divided by 2. The contracted portions 33 of a channel 31 have in this case a cross-section at least 2 times less than that of the rest of the channel.

The portions 33 of restricted cross-section within a fluidic channel 31 make it possible to locally create accelerations of the gas carried by this channel and thus obtain an increase in the head loss of the channel 31 for superior discharge of the water droplets.

The contracted portions 33 of a channel 31 are preferably distributed periodically along an active surface wherein this channel 31 extends.

Advantageously, the contracted portions 33 can be disposed at the level of troughs 31b and/or peaks 31a of the undulations.

The undulating shape of the channels 31 combined with the presence of portions 33 of contracted cross-section make it possible to prevent cell waterlogging phenomena and thus increase the service life of the cell. This specific configuration makes it possible to obtain superior management of the quantity of water inside an electrochemical cell and thus enhance the performances thereof.

As suggested above, the bipolar plate 20 can be produced by assembling several sheets 30, 40. The first array of fluidic channels 31 is in this case formed on a front face 30A of a first sheet 30 corresponding to the first outer face 20A of the plate 20, whereas the second array of fluidic channels 41 is formed on a front face 40A of a second sheet 40 corresponding to the second outer face 20B of the plate 20. The first sheet 30 and the second 40 are thus assembled at the level of the rear faces 30B, 40B thereof, opposite the front faces 30A, 40A thereof respectively.

The channels or grooves defined on the front face 30A of the first sheet 30 form on the rear face 30B of this sheet 30, embossed zones 131. Embossed zones 131 bear, at several points as can be seen in the cross-sectional view of FIG. 4A, on other embossed zones 141 formed on the rear face 40B of the second sheet 40, and correspond respectively to the channels or grooves defined on the front face 40A of this second sheet 40.

Figure 4A:
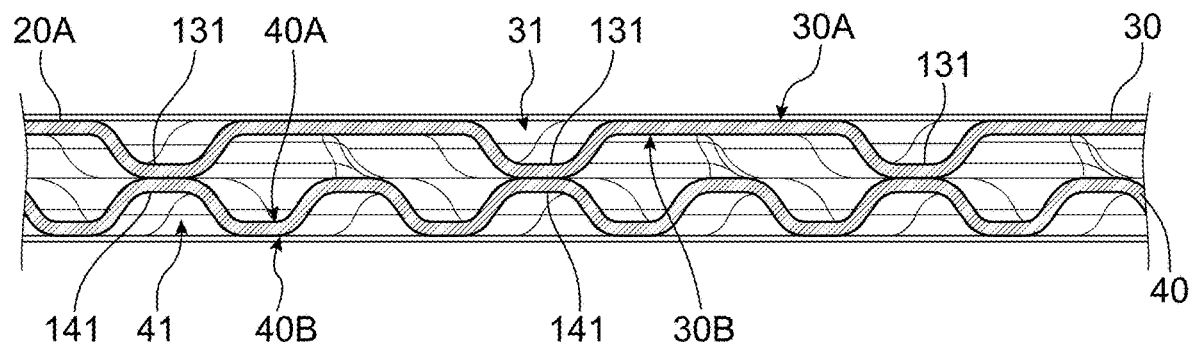
FIGS. 4A-4B illustrate an assembly of sheets forming a bipolar conductive plate with undulating cathodic and anodic channels and arranged so as to form bearing zones between the sheets enabling enhanced mechanical strength as well as spaces provided between the sheets to enable the movement of a heat transfer fluid.
Figure 4B:
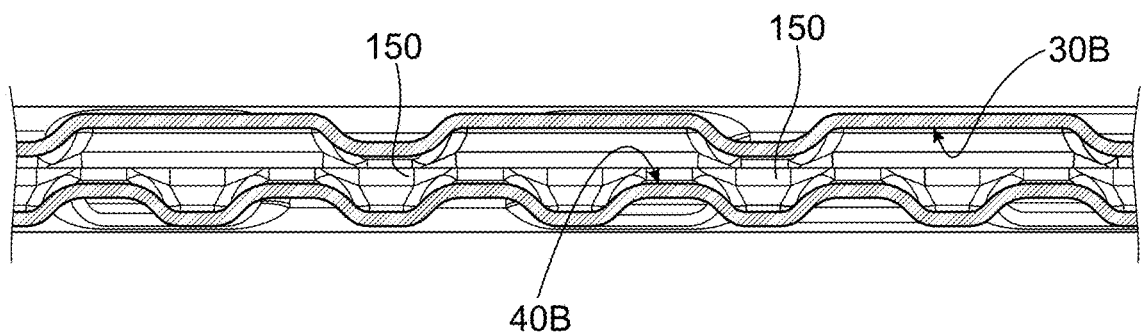

In the thickness of the bipolar plate 20, between the rear faces 30B, 40B of the sheets 30, 40 spaces 150 are however provided as can be seen in the cross-sectional view of FIG. 4A to make it possible to delimit passages for a fluid, in particular a cooling fluid, also referred to as heat transfer fluid between the sheets 30, 40. The heat transfer fluid can be water.

In the specific configuration example illustrated in FIGS. 2A-2B, the inlet and outlet of heat transfer fluid, are created using openings 28 disposed at the level of a greater side of the plate 20. The bipolar plate 20, of aspect which can be substantially rectangular, also includes on each lesser side of the rectangle an air inlet or outlet opening 24, whereas on opposite corners of the plate 20 hydrogen inlet or outlet openings 26 are featured. These openings 26 are generally smaller in size than the air inlet/outlet openings 24.

As specified above, the second face 20B of the bipolar conductive plate 20 also includes grooves forming this time cathodic channels wherein air or oxygen is intended to circulate. A second array of juxtaposed circulation channels 41 arranged in parallel is thus provided on the second face 20B of the bipolar plate 20. The channels 41 can have similar dimensions to that of the channels 31 of the first face. Typically, a greater number of cathodic channels 41 than the number of anodic channels 31 is provided. The channels 41 each extend along an axis parallel with the longitudinal axis $A_Y$ and are also each in the form of a succession of undulations, in other words, of a sequence of curved regions. The channels 41 of the second array create undulations in a succession of curved regions forming peaks 41a and troughs 41b on either side of a parallel axis with the longitudinal axis $A_Y$ of the plate 20.

The channels 41 of the second fluidic array are advantageously disposed in phase with one another.

The undulations of the channels 41 of the second array can have a similar shape to that of the channels of the first array and optionally have an amplitude and a frequency equal, respectively to the amplitude and to the frequency of the undulations of the first network.

The channels 41 of the second array also preferably include localised portions of contracted cross-sections. These localised portions are advantageously distributed periodically along the path of the channels 41. Typically, as on the first channel array, it is possible to envisage the contracted portions of the second array 41 disposed at the level of the troughs 41b and/or peaks 41a of the undulations.

Figure 5:
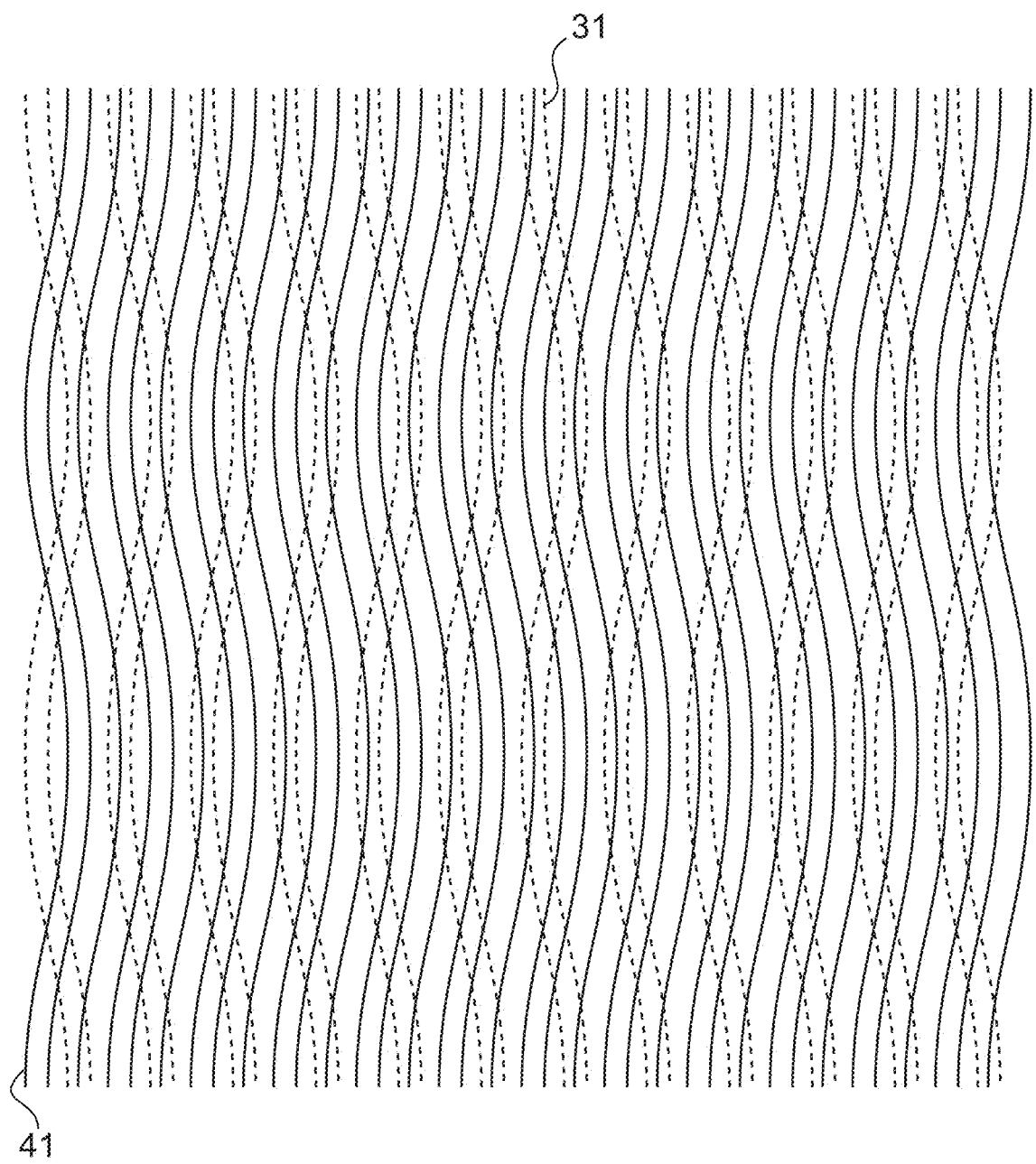
FIG. 5 illustrates a specific configuration of the undulating paths of the anodic channels with respect to the undulating paths of the cathodic channels located on opposite faces and belonging to the same bipolar conductive plate.

According to a specific arrangement options illustrated in FIG. 5, giving a top view of a portion of the second face 20B of the bipolar plate 20, it is possible to envisage advantageously that the second array of cathodic channels 41 and the first array of channels 31 exhibit a phase shift with respect to one another, if a plane orthogonal to the principal plane of the plate is considered as the reference plane.

"Principal plane" of the plate 20 denotes a parallel plane passing through the plate 20 and parallel with the plane [O;x;y] of the orthogonal reference [O;x;y;z] given in FIG. 5.

This phase-shift arrangement of the channels 31 of the first array with respect to the channels 41 of the second array makes it possible, particularly when this plate 20 is in the form of an assembly of sheets 30, 40, to ensure the flow of heat transfer fluid between the sheets 30, 40 while keeping sufficient bearing zones between the sheets 30, 40 to help ensure satisfactory mechanical rigidity of the assembly of sheets.

However, such a rigidity is important both for the mechanical strength of the fuel cell wherein the bipolar plate is liable to be integrated and for the electrical performances of this cell.

The arrangement of arrays of channels on the two opposite faces 20A and 20B can be advantageously with inverted radii of curvature between the path of the channel 31 on the first face and the path of the channels 41 on the second face. In such a so-called "phase-opposition" configuration, one or more peaks 31a respectively of one or more channels 31 of the first array located on the first face 20A of the plate 20 is located in the same plane orthogonal to the plate 20 as one or more troughs 41b respectively of one or more channels 41 of the second array located on a second face 20B of the plate 20.

Figure 6A:
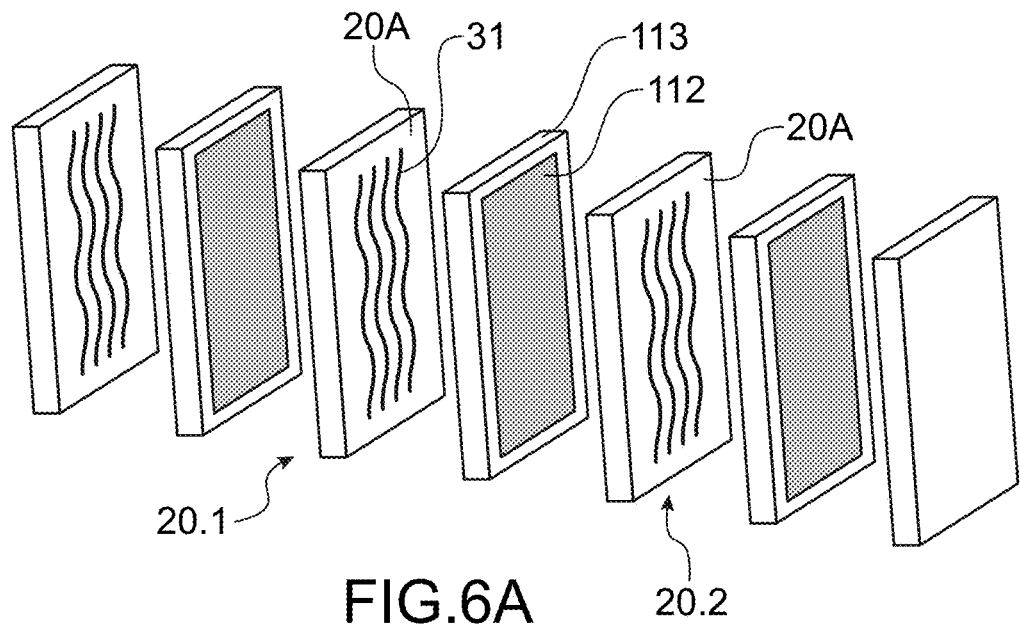
FIGS. 6A-6B illustrate a phase-opposition configuration of the anodic channels of a bipolar conductive plate with respect to the cathodic channels of another bipolar conductive plate, these two conductive plates being arranged on either side of the same MEA structure.
Figure 6B:
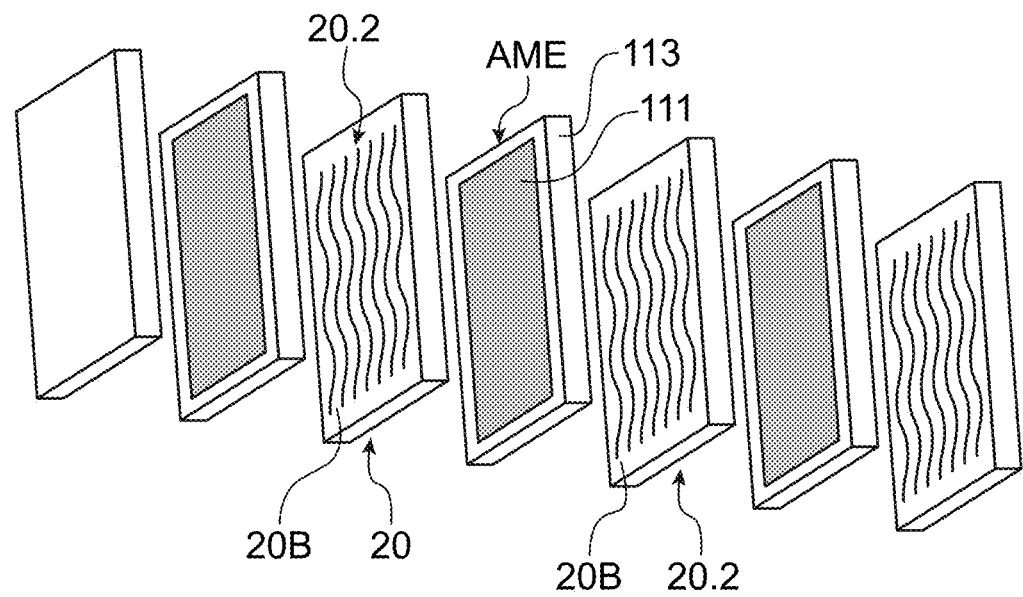

A phase-shift or phase-opposition configuration of the channels of the first array and the second array is useful in particular in a structure as illustrated in FIGS. 6A and 6B equipped with at least two bipolar plates 20.1, 20.2 of the same type as that described above, and disposed on either side of a membrane electrode assembly (MEA) structure.

The MEA structure is conventionally composed of a layer of electrolyte 113 conventionally formed of a membrane such as a solid polymer membrane, impervious to gas and suitable for leading protons from the anode to the cathode while preventing a flow of electrodes from one of the electrodes to the other.

The MEA structure can also be equipped with diffusion layers having the function of providing the reagent gas supply for active electrode layers and providing electrical conduction between a bipolar conductive plate and an active electrode layer. The electrodes of the MEA structure are an anode 111 against which the first array of channels 31 is disposed and a cathode 112 against which the second array of channels 41, in phase shift or in phase opposition with respect to the first array, is placed.

The arrangement is such that the channels 31 of a first bipolar plate 20.1 disposed against a face of an MEA structure form undulations with inverted radii of curvature or in phase opposition with respect to the undulations respectively of one or more channels 41 of a second plate 20.2 disposed against another face of the same MEA structure and opposite the face against which the first plate is disposed.

The phase shift or offset between the two arrays is taken with respect to an orthogonal plane to the principal plane of the plate.

This arrangement of the anodic channels 31 of the first array of a bipolar conductive plate 20.1 located on the first side of an MEA with respect to the cathodic channels 41 of a second array of another bipolar conductive plate 20.2 located on a second opposite side of the MEA, makes it possible to prevent untimely water accumulation and contributes to superior water circulation thus enhancing the electrical performances of the electrochemical cell formed by associating these bipolar plates and the MEA structure.

What is claimed is:

1. Bipolar conductive plate suitable for being inserted into a fuel cell structure, said plate comprising:
    a first sheet, including grooves formed therein and having a front face forming a first outer face of the bipolar conductive plate, the grooves of the first sheet forming a first array of one or more fluid circulation channels, for circulation of a fluid therethrough, said one or more fluid circulation channels being formed on the first outer face, wherein said one or more fluid circulation channels are arranged in parallel and each having a path in the form of a succession of undulations on either side of an axis parallel with a longitudinal axis of the bipolar conducting plate, the undulations creating a succession of peaks and troughs,
    a second sheet, including grooves formed therein and having a front face forming a second outer face of the bipolar conductive plate, the grooves of the second sheet forming, on the second outer face, a second array of one or more fluid circulation channels arranged in parallel,
    wherein the first sheet has a rear face, opposite to the front face and to said one or more fluid circulation channels of the first sheet and the second sheet has a rear face, opposite to said one or more fluid circulation channels of the second sheet, the rear face of the first sheet being in contact with the rear face of the second sheet at contact zones of the bipolar conductive plate, and
    wherein said one or more fluid circulation channels of the first sheet include, for the circulation of the fluid, main portions and portions of contracted cross-section, which have a cross section at least divided by two compared to the cross-section of the main portions,
    wherein said portions of contracted cross-section are distributed at the peaks or troughs of the undulations of the channels.

2. The bipolar conductive plate according to claim 1, said portions of contracted cross-section being distributed periodically along the path of said channels.

3. The bipolar conductive plate according to claim 1, wherein the fluid circulation channels of said second array are each in the form of a succession of undulations on either side of an axis parallel with the longitudinal axis.

4. The bipolar conductive plate according to claim 3, wherein the undulations of the channels of said second array are in phase shift or in phase opposition with respect to the undulations of the channels of said first array of channels.

5. The bipolar conductive plate according to claim 1, wherein the second array includes a greater number of channels than the number of channels of said first array.

6. The bipolar conductive plate according to claim 1, wherein the first sheet is assembled with the second sheet and wherein at each contact zone, a first groove among the grooves of the first array is in contact with a second groove from among the grooves of the second array, the grooves of the first array being arranged with respect to the grooves of the second array so as to arrange a volume for the passage of heat transfer fluid between the rear face of the first sheet and the rear face of the second sheet, the transfer fluid flowing from a first opening located at a first outer edge of the bipolar conductive plate and a second opening located at a second outer edge of the bipolar conductive plate opposite the first edge.

7. Fuel cell structure comprising:
    at least one membrane electrode assembly,
    at least one bipolar plate according to claim 1.

8. Fuel cell structure comprising:
    at least one membrane electrode assembly; and
    first and second bipolar plates each being a bipolar conductive plate according to claim 1,
    wherein the first bipolar plate is located on a first side of said membrane electrode assembly, the first plate being provided with an array of anodic channels in the form of a succession of undulations, and wherein the second bipolar plate is located on a second side of the membrane electrode assembly and provided the undulations of the cathodic channels being in phase opposition or having inverted radii of curvature with respect to the undulations of the anodic channels.

9. Vehicle equipped with a fuel cell comprising at least one bipolar conductive plate according to claim 1.

* * * * *